US011921814B2

United States Patent
Chen et al.

(10) Patent No.: US 11,921,814 B2
(45) Date of Patent: **\*Mar. 5, 2024**

(54) METHOD AND DEVICE FOR MATRIX MULTIPLICATION OPTIMIZATION USING VECTOR REGISTERS

(71) Applicant: ALIBABA GROUP HOLDING LIMITED, Grand Cayman (KY)

(72) Inventors: Guoyang Chen, San Mateo, CA (US); Yu Pu, San Mateo, CA (US); Yongzhi Zhang, San Mateo, CA (US); Weifeng Zhang, San Mateo, CA (US); Yuan Xie, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,810

(22) Filed: Jun. 14, 2022

(65) Prior Publication Data

US 2022/0300577 A1    Sep. 22, 2022

Related U.S. Application Data

(63) Continuation of application No. 16/818,833, filed on Mar. 13, 2020, now Pat. No. 11,366,875.

(51) Int. Cl.
*G06F 17/16* (2006.01)
*G06N 3/04* (2023.01)
*G06N 3/082* (2023.01)

(52) U.S. Cl.
CPC ............... *G06F 17/16* (2013.01); *G06N 3/04* (2013.01); *G06N 3/082* (2013.01)

(58) Field of Classification Search
CPC .......... G06F 17/16; G06N 3/04; G06N 3/082; G06N 3/063
USPC ....................................................... 708/520
See application file for complete search history.

(56) References Cited

U.S. PATENT DOCUMENTS

| | | | |
|---|---|---|---|
| 11,392,829 B1 * | 7/2022 | Pool | ......................... G06F 17/16 |
| 2011/0307685 A1 | 12/2011 | Song | |
| 2018/0131946 A1 | 5/2018 | Lee et al. | |
| 2019/0266217 A1 | 8/2019 | Arakawa et al. | |
| 2020/0311181 A1 * | 10/2020 | Azizi | .................. G06F 9/30036 |
| 2021/0065005 A1 | 3/2021 | Zhu et al. | |

FOREIGN PATENT DOCUMENTS

CN    103336758 A    10/2013

\* cited by examiner

*Primary Examiner* — Tan V Mai
(74) *Attorney, Agent, or Firm* — Finnegan, Henderson, Farabow, Garrett & Dunner, LLP

(57) ABSTRACT

Methods and devices, the method including receiving a matrix of a neural network model; classifying at least a portion of the matrix as a first section based on a first distribution pattern of non-zero elements of the portion of the matrix; and identifying memory addresses of the non-zero elements in the first section of the matrix for loading, according to a first order determined based on the first distribution pattern, the non-zero elements in the first section into one or more vector registers.

18 Claims, 10 Drawing Sheets

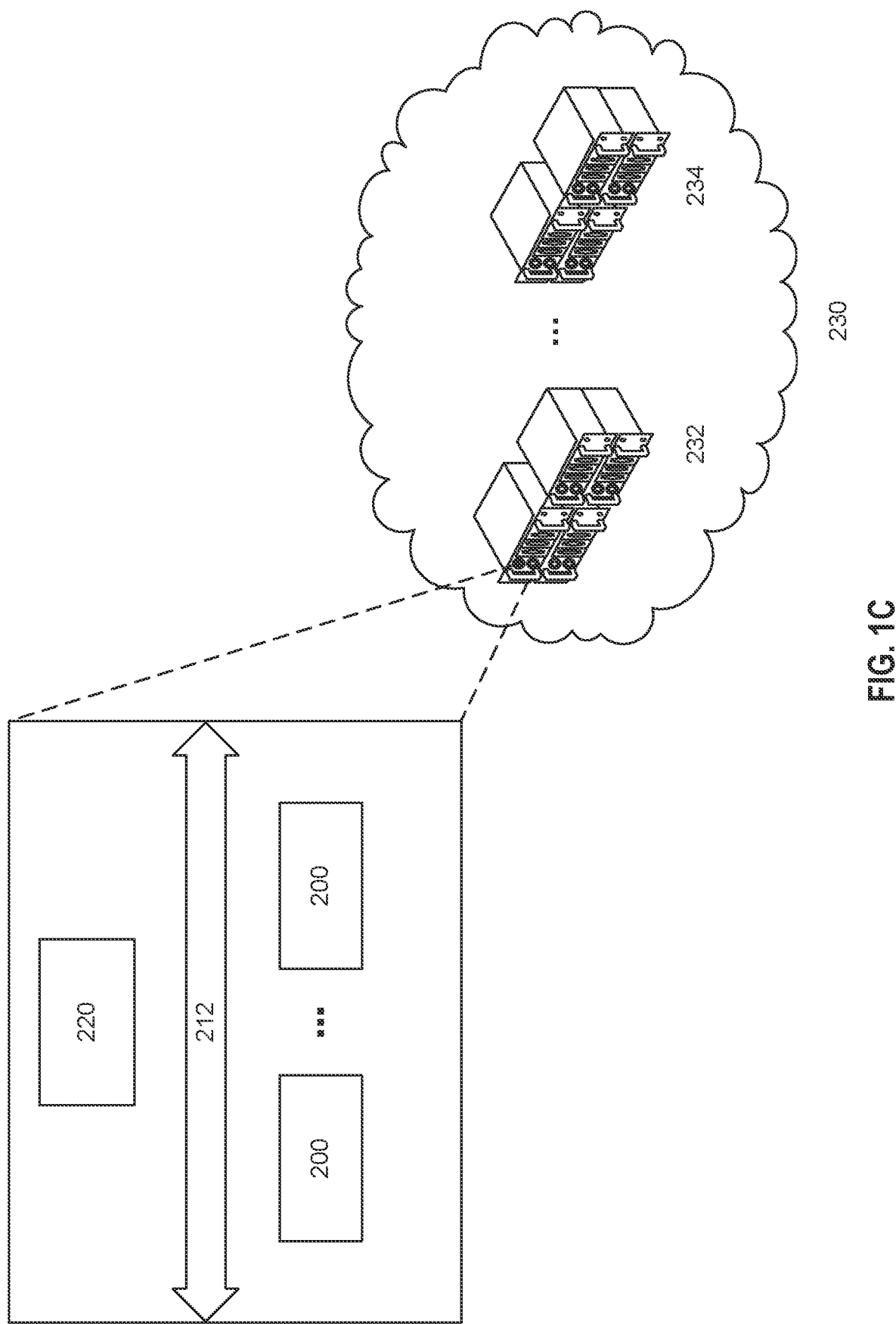

FIG. 2A

Matrix X

Matrix Z

Matrix Y

FIG. 4B

Matrix X

Matrix Z

Matrix Y

METHOD AND DEVICE FOR MATRIX MULTIPLICATION OPTIMIZATION USING VECTOR REGISTERS

CROSS-REFERENCE TO RELATED APPLICATIONS

The present application is a continuation of Ser. No. 16/818,833 filed Mar. 13, 2020, which is incorporated herein by reference in its entirety.

BACKGROUND

Artificial neural networks (ANN) are computing systems inspired by biological neural networks. Such systems learn to perform tasks by considering examples, generally without being programmed with task-specific rules. ANNs have been used on a variety of tasks, including computer vision, speech recognition, machine translation, social network filtering, playing board and video games, and medical diagnosis.

SUMMARY

Embodiments of the present disclosure provide methods and devices. The method includes: receiving a matrix of a neural network model; classifying at least a portion of the matrix as a first section based on a first distribution pattern of non-zero elements of the portion of the matrix; and identifying memory addresses of the non-zero elements in the first section of the matrix for loading, according to a first order determined based on the first distribution pattern, the non-zero elements in the first section into one or more vector registers.

BRIEF DESCRIPTION OF THE DRAWINGS

The accompanying drawings described herein are used to provide further understanding of the present disclosure and constitute a part of the present disclosure. Exemplary embodiments of the present disclosure and descriptions of the exemplary embodiments are used to explain the present disclosure and are not intended to constitute inappropriate limitations to the present disclosure. In the accompanying drawings:

FIG. 1C illustrates a schematic diagram of an exemplary cloud system incorporating a neural network accelerator, consistent with embodiments of the present disclosure.

FIG. 2A illustrates a schematic diagram of exemplary matrix multiplication having an input matrix, a weight matrix and an output matrix.

FIG. 4B illustrates a schematic diagram of exemplary matrix multiplication optimization in a row-dominant section, consistent with some embodiments of the present disclosure.

FIG. 4C illustrates a schematic diagram of exemplary matrix multiplication optimization in a column-dominant section, consistent with some embodiments of the present disclosure.

DETAILED DESCRIPTION

Figure 1A:
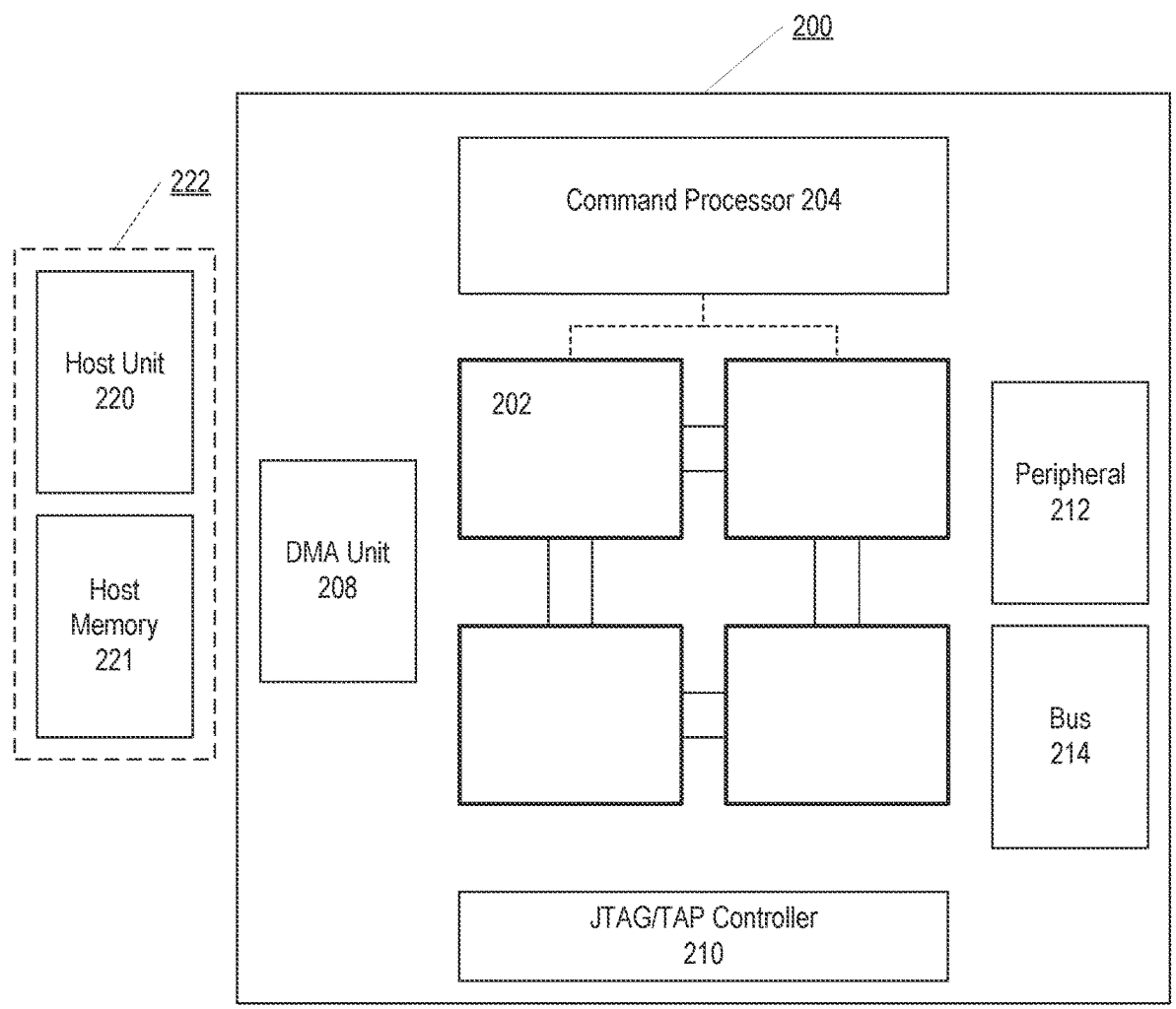
FIG. 1A illustrates a schematic diagram of an exemplary neural network accelerator core architecture, consistent with some embodiments of the present disclosure.

To facilitate understanding of the solutions in the present disclosure, the technical solutions in some of the embodiments of the present disclosure will be described with reference to the accompanying drawings. It is appreciated that the described embodiments are merely a part of rather than all the embodiments of the present disclosure. Consistent with the present disclosure, other embodiments can be obtained without departing from the principles disclosed herein. Such embodiments shall also fall within the protection scope of the present disclosure.

In a neural network system, larger models, such as deep learning models, may require more memory and computational resources. To reduce resource requirements, pruning may be used to reduce the size of a model in the neural network system. In one example, pruning includes setting individual weight elements in a weight matrix to zero. As the number of the individual weight elements increases, sparsity of the weight elements of the weight matrix can also increase. In other words, fewer elements are present in the weight matrix such that accuracy is decreased by pruning. Thus, one drawback of pruning is preserving computing resources by maintaining fewer elements for calculation at the cost of losing model accuracy.

Pruning strategies include structured pruning and pattern pruning. Some structured pruning strategies reduce weight elements of a weight matrix in deep neural networks (DNNs) along one or more dimensions. In comparison, the pattern pruning has better accuracy but results in irregular sparsity of the weight elements in the weight matrix of a model. The irregular sparsity makes model acceleration difficult.

In DNNs, one frequent computing operation is matrix multiplication. In matrix multiplication, sparse elements are processed by various approaches. According to one approach, elements smaller than a certain value are marked as zeros. However, zero-value elements are still computed, which is an unnecessary use of computing power. According to another approach, matrixes are stored in sparse format such as CSR format. However, due to irregularity of the CSR format, divergent computations implemented by scalar computations or vector computations with fixed maximal vector length are used. This approach does not utilize the variable length of vector registers as some elements in the vector registers are empty. Computing power is also wasted.

The disclosed embodiments provide improvements over these conventional systems and methods. For example, in some embodiments, non-zero weight elements in a pruned weight matrix of a neural network model are represented by vector registers with variable length. An exemplary instruction set architecture (ISA) having variable length vectors can be RISC-V.

Moreover, in some embodiments, the weight matrix is partitioned into at least one row-dominant section and at least one column-dominant section. The non-zero weight elements are represented by the vector registers along a row in the row-dominant section and along a column in the column-dominant section.

FIG. 1A illustrates an exemplary neural network accelerator architecture 200, consistent with embodiments of the present disclosure. In the present disclosure, neural network accelerator architecture 200 may also be referred to as a machine learning accelerator or deep learning accelerator. In some embodiments, accelerator architecture 200 may also be referred to as a neural network processing unit (NPU) architecture 200. As shown in FIG. 1A, accelerator architecture 200 can include a plurality of cores 202, a command processor 204, a direct memory access (DMA) unit 208, a Joint Test Action Group (JTAG)/Test Access Port (TAP) controller 210, a peripheral interface 212, a bus 214, and the like.

Cores 202 can perform algorithmic operations based on communicated data. Cores 202 can include one or more processing elements that may include single instruction, multiple data (SIMD) architecture including one or more processing units configured to perform one or more operations (e.g., multiplication, addition, multiply-accumulate, etc.) based on commands received from command processor 204. In some embodiments, the one or more processing elements of cores 202 may also include RISC-V architecture including one or more processing units configured to perform one or more operations (e.g., matrix multiplication) based on commands received from command processor 204. One core of cores 202 can be a RISC-V processor. To perform operations on the communicated data packets from a host unit 220 or a host memory 221, described more fully below, cores 202 can include one or more processing elements for processing information in the data packets. Each processing element may comprise any number of processing units. According to some embodiments of the present disclosure, accelerator architecture 200 may include a plurality of cores 202, e.g., four cores. In some embodiments, the plurality of cores 202 can be communicatively coupled with each other. For example, the plurality of cores 202 can be connected with a single directional ring bus, which supports efficient pipelining for large neural network models. The architecture of cores 202 will be explained in detail below with respect to FIG. 1B.

Command processor 204 can interact with host unit 220 and pass pertinent commands and data to one or more corresponding cores 202. In some embodiments, command processor 204 can interact with host unit 220 under the supervision of a kernel mode driver (KMD). In some embodiments, command processor 204 can modify the pertinent commands to each core 202, so that cores 202 can work in parallel as much as possible. The modified commands can be stored in an instruction buffer. In some embodiments, command processor 204 can be configured to coordinate operation of one or more cores 202 for parallel execution.

DMA unit 208 can assist with transferring data between host memory 221 of host unit 220 and accelerator architecture 200. For example, DMA unit 208 can assist with loading data or instructions from host memory 221 into local memory of cores 202. DMA unit 208 can also assist with transferring data between multiple accelerators. DMA unit 208 can allow off-chip devices to access both on-chip and off-chip memory without causing a host CPU interrupt. In addition, DMA unit 208 can assist with transferring data between components of accelerator architecture 200. For example, DMA unit 208 can assist with transferring data between multiple cores 202 or within each core. Thus, DMA unit 208 can also generate memory addresses and initiate memory read or write cycles. DMA unit 208 also can contain several hardware registers that can be written and read by the one or more processors, including a memory address register, a byte-count register, one or more control registers, and other types of registers. These registers can specify some combination of a source, a destination, the direction of data transfer (reading from an input/output (I/O) device or writing to the I/O device), the size of a transfer unit, or a number of bytes to transfer in one burst. It is appreciated that accelerator architecture 200 can include a second DMA unit, which can be used to transfer data with other accelerator architectures to allow multiple accelerator architectures to communicate directly without involving host unit 220.

JTAG/TAP controller 210 can specify a dedicated debug port implementing a serial communications interface (e.g., a JTAG interface) for low-overhead access to accelerator architecture 200 without requiring direct external access to system address and data buses. JTAG/TAP controller 210 can also have an on-chip test access interface (e.g., a TAP interface) that implements a protocol to access a set of test registers that present chip logic levels and device capabilities of various parts.

Peripheral interface 212 (such as a PCIe interface), if present, serves as an (and typically the) inter-chip bus, providing communication between accelerator architecture 200 and other devices.

Bus 214 (such as an $I^2C$ bus) may include both intra-chip and inter-chip buses. The intra-chip bus connects all internal components to one another as called for by the system architecture. While not all components are connected to every other component, all components do have some connection to other components with which they need to communicate. The inter-chip bus connects accelerator architecture 200 with other devices, such as off-chip memory (e.g., host memory 221) or peripherals. For example, bus 214 can provide high speed communication across cores and can also connect cores 202 with other units, such as the off-chip memory or peripherals. Typically, if there is a peripheral interface 212 (e.g., the inter-chip bus), bus 214 is solely concerned with intra-chip buses, though in some implementations it can still be concerned with specialized inter-bus communications.

Accelerator architecture 200 can also communicate with host unit 220. Host unit 220 can include one or more processing units (e.g., an X86 central processing unit). As shown in FIG. 1A, host unit 220 may be associated with host memory 221. In some embodiments, host memory 221 may be a memory integral to host unit 220 or an external memory associated with host unit 220. In some embodiments, host memory 221 may comprise a host disk, which is an external memory configured to provide additional memory for host unit 220. Host memory 221 can be a double data rate synchronous dynamic random-access memory (e.g., DDR SDRAM) or the like. Host memory 221 can be configured to store a large amount of data with slower access speed, compared to an on-chip memory integrated within accelerator chip, acting as a higher-level cache. The data stored in host memory 221 may be transferred to accelerator architecture 200 to be used for executing neural network models.

In some embodiments, a host system 222 comprising host unit 220 and host memory 221 can comprise a compiler (not shown). The compiler is a program or computer software that transforms computer codes written in one programming language into instructions for accelerator architecture 200 to create an executable program. In machine learning applications, a compiler can perform a variety of operations, for example, pre-processing, lexical analysis, parsing, semantic analysis, conversion of input programs to an intermediate representation, initialization of a neural network, code optimization, and code generation, or combinations thereof. For example, the compiler can compile a neural network to generate static parameters, e.g., connections among neurons and weights of the neurons.

In some embodiments, host system 222 including the compiler may push one or more commands to accelerator architecture 200. As discussed above, these commands can be further processed by command processor 204 of accelerator architecture 200, temporarily stored in an instruction buffer of accelerator architecture 200, and distributed to corresponding one or more cores (e.g., cores 202) or processing elements. Some of the commands may instruct a DMA unit (e.g., DMA unit 208) to load instructions and data from host memory (e.g., host memory 221) into accelerator architecture 200. The loaded instructions may then be distributed to each core (e.g., one or more of cores 202 assigned with the corresponding task, and the one or more cores may process these instructions.

Figure 1B:
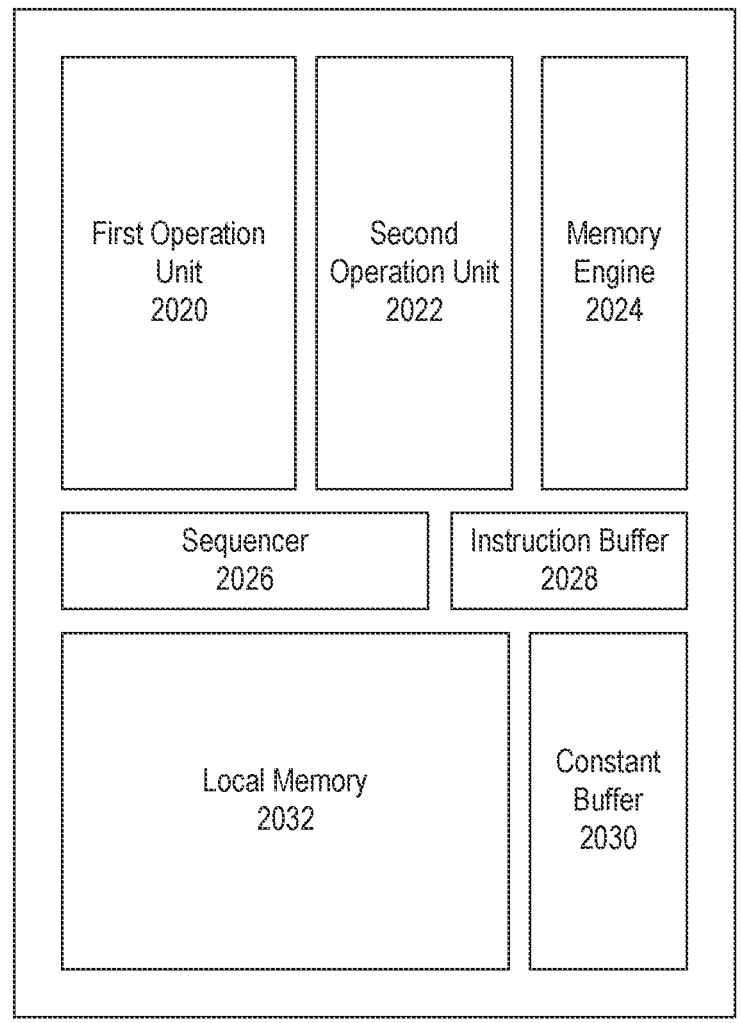
FIG. 1B illustrates a schematic diagram of an exemplary neural network accelerator core architecture, consistent with some embodiments of the present disclosure.

It is appreciated that the first few instructions received by cores 202 may instruct cores 202 to load/store data from host memory 221 into one or more local memories of the cores (e.g., local memory 2032 of FIG. 1B). Each core 202 may then initiate an instruction pipeline, which involves fetching the instruction (e.g., via a sequencer) from the instruction buffer, decoding the instruction (e.g., via DMA unit 208), generating local memory addresses (e.g., corresponding to an operand), reading the source data, executing or loading/storing operations, and then writing back results.

According to some embodiments, accelerator architecture 200 can further include a global memory (not shown) having memory blocks (e.g., four blocks of 8 GB second generation of high bandwidth memory (HBM2)) to serve as main memory. In some embodiments, the global memory can store instructions and data from host memory 221 via DMA unit 208. The instructions can then be distributed to an instruction buffer of each core assigned with the corresponding task, and the core can process these instructions accordingly.

In some embodiments, accelerator architecture 200 can further include a memory controller (not shown) configured to manage reading and writing of data to and from a specific memory block (e.g., HBM2) within global memory. For example, the memory controller can manage read/write data coming from the core of another accelerator (e.g., from DMA unit 208 or a DMA unit corresponding to the another accelerator) or from core 202 (e.g., from a local memory in core 202). It is appreciated that more than one memory controller can be provided in accelerator architecture 200. For example, there can be one memory controller for each memory block (e.g., HBM2) within global memory.

The memory controller can generate memory addresses and initiate memory read or write cycles. The memory controller can contain several hardware registers that can be written and read by the one or more processors of cores 202. The hardware registers can include a memory address register, a byte-count register, one or more control registers, and other types of registers. These registers can specify some combination of source, destination, direction of transfer (reading from the input/output (I/O) device or writing to the I/O device), size of a transfer unit, number of bytes to transfer in one burst, or other typical features of memory controllers.

While accelerator architecture 200 of FIG. 1A can be used for deep neural networks (DNNs) in some embodiments of the present disclosure, it is appreciated that accelerator architecture 200 of FIG. 1A can be utilized in various neural networks, such as convolutional neural networks (CNNs), recurrent neural networks (RNNs), or the like. In addition, some embodiments can be configured for various processing architectures, such as neural network processing units (NPUs), graphics processing units (GPUs), field programmable gate arrays (FPGAs), tensor processing units (TPUs), application-specific integrated circuits (ASICs), any other types of heterogeneous accelerator processing units (HAPUs), or the like FIG. 1B illustrates an exemplary neural network accelerator core architecture, consistent with embodiments of the present disclosure. As shown in FIG. 1B, core 202 can include one or more operation units such as first and second operation units 2020 and 2022, a memory engine 2024, a sequencer 2026, an instruction buffer 2028, a constant buffer 2030, a local memory 2032, or the like.

One or more operation units can include first operation unit 2020 and second operation unit 2022. First operation unit 2020 can be configured to perform operations on received data (e.g., matrices). In some embodiments, first operation unit 2020 can include one or more processing units configured to perform one or more operations (e.g., multiplication, addition, multiply-accumulate, element-wise operation, etc.). In some embodiments, first operation unit 2020 is configured to accelerate execution of convolution operations or matrix multiplication operations.

Second operation unit 2022 can be configured to perform a pooling operation, an interpolation operation, a region-of-interest (ROI) operation, and the like. In some embodiments, second operation unit 2022 can include an interpolation unit, a pooling data path, and the like.

Memory engine 2024 can be configured to perform a data copy within a corresponding core 202 or between two cores. DMA unit 208 can assist with copying data within a corresponding core or between two cores. For example, DMA unit 208 can support memory engine 2024 to perform data copying from a local memory (e.g., local memory 2032) into one of operation units 2020 or 2022. Memory engine 2024 can also be configured to perform matrix transposition to make the matrix suitable for use in the operation unit.

Sequencer 2026 can be coupled with instruction buffer 2028 and configured to retrieve commands and distribute the commands to components of core 202. For example, sequencer 2026 can distribute convolution commands or multiplication commands to first operation unit 2020, distribute pooling commands to second operation unit 2022, or distribute data copy commands to memory engine 2024. Sequencer 2026 can also be configured to monitor execution of a neural network task and parallelize sub-tasks of the neural network task to improve efficiency of the execution. In some embodiments, first operation unit 2020, second operation unit 2022, and memory engine 2024 can run in parallel under control of sequencer 2026 according to instructions stored in instruction buffer 2028.

Instruction buffer 2028 can be configured to store instructions belonging to the corresponding core 202. In some embodiments, instruction buffer 2028 is coupled with sequencer 2026 and provides instructions to sequencer 2026. In some embodiments, instructions stored in instruction buffer 2028 can be transferred or modified by command processor 204.

Constant buffer 2030 can be configured to store constant values. In some embodiments, constant values stored in constant buffer 2030 can be used by operation units such as first operation unit 2020 or second operation unit 2022 for batch normalization, quantization, de-quantization, or the like.

Local memory 2032 can provide storage space with fast read/write speed. To reduce possible interaction with a global memory, storage space of local memory 2032 can be implemented with large capacity. With such large capacity storage space, most data access can be performed within core 202 with reduced latency caused by data access. In some embodiments, to minimize data loading latency and energy consumption, SRAM (static random access memory) integrated on chip can be used as local memory 2032. In some embodiments, local memory 2032 can have a capacity of 192 MB or more. According to some embodiments of the present disclosure, local memory 2032 can be evenly distributed on chip to relieve dense wiring and heating issues.

FIG. 1C illustrates a schematic diagram of an exemplary cloud system 230 incorporating accelerator architecture 200, consistent with embodiments of the present disclosure. As shown in FIG. 1C, cloud system 230 can provide a cloud service with artificial intelligence (AI) capabilities and includes a plurality of computing servers (e.g., servers 232 and 234). In some embodiments, each of computing servers 232 and 234 can, for example, incorporate a neural network accelerator architecture such as architecture 200 of FIG. 1A. Neural network accelerator architecture 200 is shown in FIG. 1C in a simplified manner for simplicity and clarity as incorporated in server 232.

With the assistance of neural network accelerator architecture 200, cloud system 230 can provide extended AI capabilities of image recognition, facial recognition, translations, 3D modeling, and the like. It is appreciated that neural network accelerator architecture 200 can be deployed to computing devices in other forms. For example, neural network accelerator architecture 200 can also be integrated in a computing device, such as a smart phone, a tablet, and a wearable device.

The disclosed embodiments provide improvements over these systems and methods. For example, in some embodiments, non-zero weight elements in a pruned weight matrix of a neural network model are represented by vector registers having variable length. An exemplary instruction set architecture (ISA) having variable length vectors can be RISC-V.

Moreover, in some embodiments, the weight matrix is partitioned into at least one row-dominant section and at least one column-dominant section. Vector registers represent the non-zero weight elements along a row in the row-dominant section and along a column in the column-dominant section.

Figure 2A:
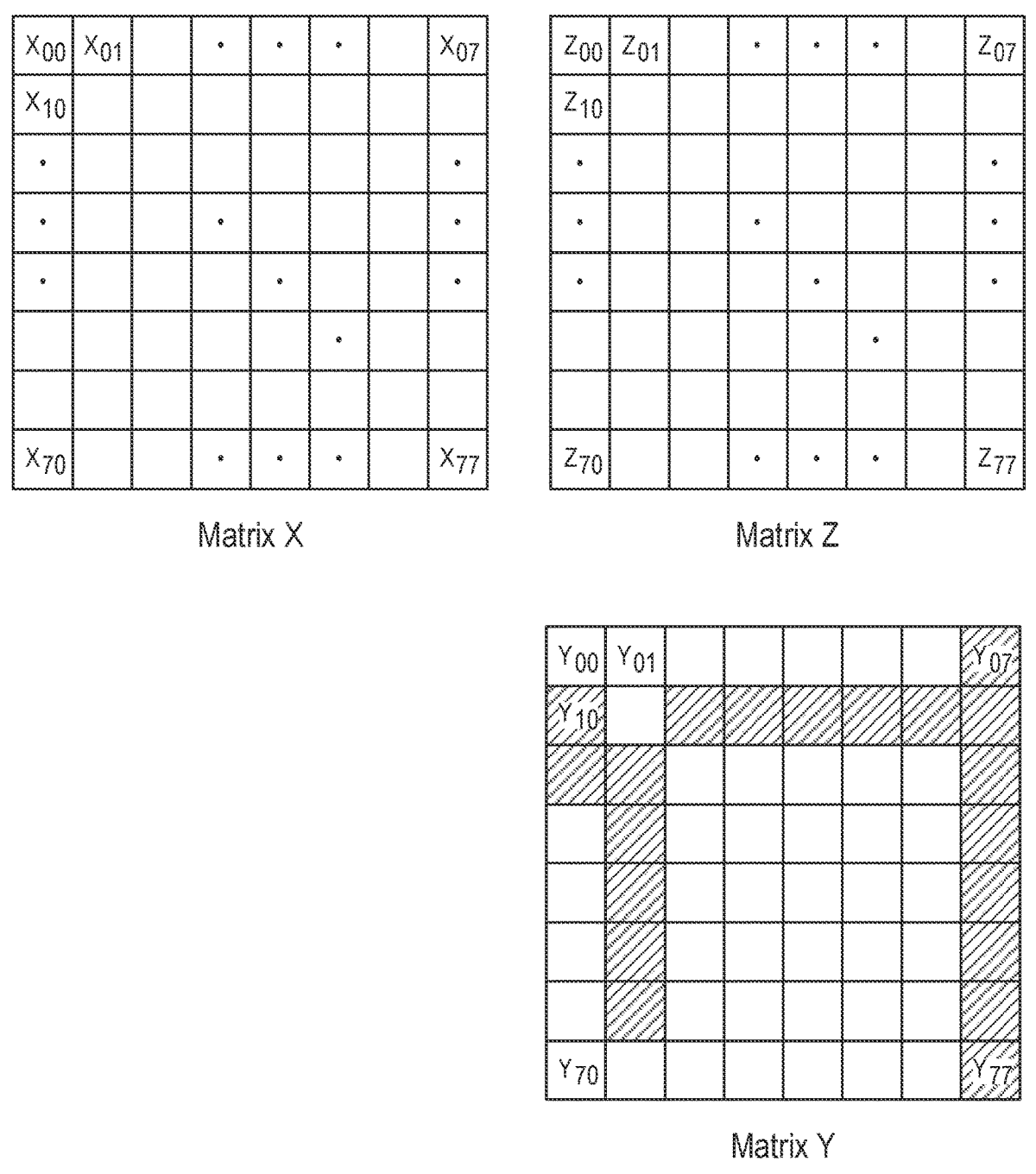

As shown in FIG. 2A, in exemplary matrix multiplication, multiplication of an input matrix X and a weight matrix Y generates an output matrix Z. In the matrix multiplication, the value of the output element $Z_{00}$ is the dot product of the first row of the input matrix X and the first column of the weight matrix Y: $Z_{00}=X_{00}*Y_{00}+X_{01}*Y_{10}+X_{02}*Y_{20}+\ldots+X_{07}*Y_{70}$. However, in the weight matrix Y, except for elements $Y_{10}$ and $Y_{20}$, the other elements in the first column are zeros, as denoted by the shading of elements $Y_{10}$ and $Y_{20}$. Elements in the input matrix X are zeros and non-zeros, and it is common that the input matrix X of a neural network model has mostly non-zero elements. In the example illustrated in the embodiments of the present disclosure, zeros and non-zeros in the input matrix X are not differentiated and are treated in the same manner. Similarly, zero elements and non-zero elements in the output matrix Z are also not differentiated. The improvements on computing efficiency can be obtained by processing zero elements and non-zero elements differently in the weight matrix Y. Thus, some approaches perform multiplication using all elements in the matrixes, even when they are zeros, which is an inefficient use of computing resources. To avoid unnecessary use of computing power, in some embodiments of the present disclosure, only non-zero elements (e.g., $Y_{10}$ and $Y_{20}$ in the first column) are used in performing a computation, such as multiplication. The zero elements are not loaded into any registers for matrix multiplication.

In addition, according to some approaches, the elements along the columns are loaded into the vector registers. However, the elements may be sparsely positioned in the matrix, and it may not be desirable to load all of the elements along the columns into vector registers. For example, five non-zero elements $Y_{12}, Y_{13}, \ldots,$ and $Y_{16}$ are positioned in the second row of the matrix Y and there are no non-zero elements in the corresponding columns of these five elements. The above-described matrix multiplication to compute $Z_{02}$ to $Z_{06}$ requires instructions, e.g., first instruction to multiply element $X_{01}$ and element $Y_{02}$ is required to obtain element $Z_{02}$, and a second instruction to multiply element $X_{01}$ and element $Y_{03}$ to obtain $Z_{03}$, etc. Overall, five instructions are required to perform five multiplication operations to obtain element from $Z_{02}$ to $Z_{06}$, as elements of the output matrix Z by the dot product of elements of input matrix X and elements of weight matrix Y. Thus, execution of such instructions is an inefficient use of computing resources. The disclosed embodiments provide improvements over such inefficient matrix multiplication approaches. Instead of loading into registers the non-zero elements along one dimension, the non-zero elements in both row dimension and column dimension are loaded into the registers before multiplication, according to some embodiments of the present disclosure.

Figure 2B:
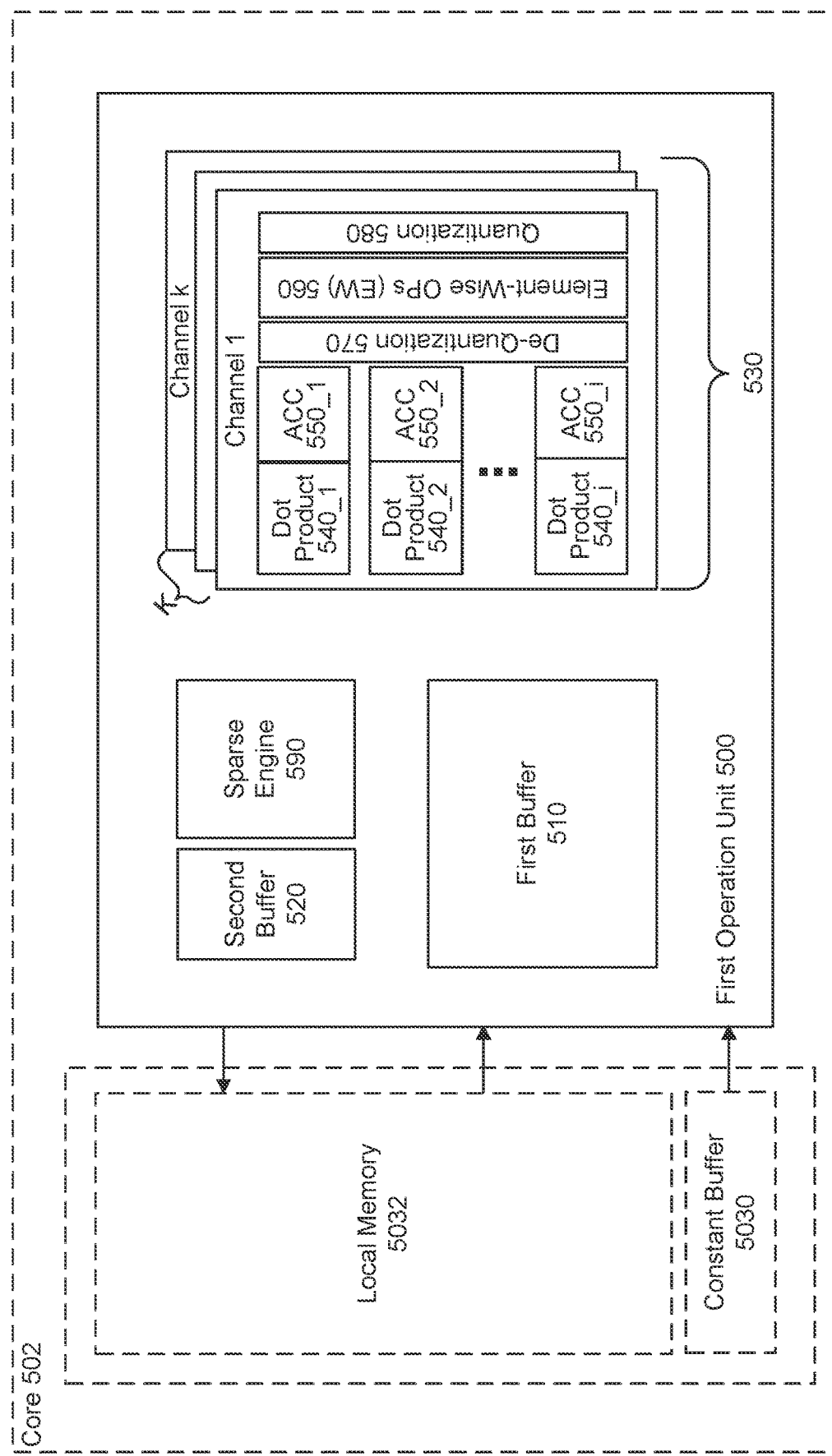
FIG. 2B illustrates a schematic representation of an exemplary operation unit, consistent with embodiments of the present disclosure.

FIG. 2B is a schematic representation of an exemplary operation unit configuration 500, according to some embodiments of the present disclosure. In some embodiments, operation unit 500 can be first operation unit (e.g., first operation unit 2020 of FIG. 1B) included in a core 502 (e.g., core 202 of FIGS. 1A-1B). Operation unit 500 can include a first buffer 510, a second buffer 520, and a processing array 530.

First buffer 510 can be configured to store input data. In some embodiments, data stored in first buffer 510 can be input data (e.g. the input matrix X of FIG. 2A) to be used in processing array 530 for execution. In some embodiments, the input data can be fetched from local memory 5032 (e.g., local memory 2032 in FIG. 1B). First buffer 510 can be configured to support reuse or share of data to be used in processing array 530. In some embodiments, input data stored in first buffer 510 can be activation data for a convolution operation.

Second buffer 520 can be configured to store matrix data, such as a representation of sparse matrix (e.g. the weight matrix Y of FIG. 2A). For example, operation unit 500 can read, fetch or receive the representation from local memory 5032 through a memory engine (not shown, e.g., memory engine 2024 of FIG. 1B), and store the representation in second buffer 520. In some embodiments, second buffer 520 can be a part of or separate from first buffer 510. Second buffer 520 can be any suitable memory that provides storage space for data such as matrix or representation, such as a register, Dynamic Random Access Memory (DRAM), Static Random Access Memory (SRAM), or the like.

Operation unit 500 can also include processing array 530 that can have a plurality of layers (e.g., K layers). According to some embodiments of the present disclosure, each layer of processing array 530 can include a plurality of processing strings, which may perform computations in parallel. For example, first processing string included in the first layer of processing array 530 can comprise a first multiplier (e.g., dot product) 540_1 and a first accumulator (ACC) 550_1 and second processing string can comprise a second multiplier 540_2 and a second accumulator 550_2. Similarly, $i^{th}$ processing string in the first layer can comprise an $i^{th}$ multiplier 540_$i$ and an $i^{th}$ accumulator 550_$i$.

In some embodiments, processing array 530 can perform computations under SIMD control. For example, when performing a convolution operation, each layer of processing array 530 can execute same instructions with different data.

According to some embodiments of the present disclosure, processing array 530 shown in FIG. 2B can be included in a core (e.g., core 202 in FIG. 1A or FIG. 1B). When a number of processing strings (e.g., i number of processing strings) included in one layer of processing array 530 is smaller than a number of work items (e.g., B number of work items), i number of work items can be executed by processing array 530 and subsequently the rest of work items (B-i number of work items) can be executed by the processing array 530 in some embodiments. In some other embodiments, i number of work items can be executed by processing array 530 and the rest of work items can be executed by another processing array 530 in another core.

According to some embodiments of the present disclosure, processing array 530 can further include an element-wise operation processor (OP) 560. In some embodiments, element-wise operation processor 560 can be positioned at the end of processing strings. In some embodiments, processing strings in each layer of processing array 530 can share element-wise operation processor 560. For example, i number of processing strings in the first layer of processing array 530 can share element-wise operation processor 560. In some embodiments, element-wise operation processor 560 in the first layer of processing array 530 can perform its element-wise operation on each of output values, from accumulators 550_1 to 550_$i$, sequentially. Similarly, element-wise operation processor 560 in the Kth layer of processing array 530 can perform its element-wise operation on each of output values, from accumulators 550_1 to 550_$i$, sequentially. In some embodiments, element-wise operation processor 560 can be configured to perform a plurality of element-wise operations. In some embodiments, element-wise operation performed by the element-wise operation processor 560 may include an activation function such as ReLU function, ReLU6 function, Leaky ReLU function, Sigmoid function, Tan h function, or the like.

In some embodiments, multiplier 540 or accumulator 550 may be configured to perform its operation on different data type from what the element-wise operation processor 560 performs its operations on. For example, multiplier 540 or accumulator 550 can be configured to perform its operations on integer type data such as Int 8, Int 16, and the like and element-wise operation processor 560 can perform its operations on floating point type data such as FP24, and the like. Therefore, according to some embodiments of the present disclosure, processing array 530 can further include de-quantizer 570 and quantizer 580 with element-wise operation processor 560 positioned therebetween. In some embodiments, batch normalization operations can be merged to de-quantizer 570 because both de-quantizer 570 and batch normalization operations can be performed by multiplication operations and addition operations with constants, which can be provided from constant buffer 5030 (e.g., constant buffer 2030 of FIG. 1B). In some embodiments, batch normalization operations and de-quantization operations can be merged into one operation by compiler. As shown in FIG. 2B, constant buffer 5030 can provide constants to de-quantizer 570 for de-quantization or batch normalization.

Operation unit 500 can also include a sparse engine 590 communicatively coupled with second buffer 520 and configured to read data from or write data to second buffer 520. Sparse engine 590 can provide decompressed sparse matrix 593 to processing array 530, and processing array 530 can perform a computation (e.g., addition and multiplication for the matrix multiplication of FIG. 2A, multiply-accumulate, convolution, or the like) on the decompressed sparse matrix. In some embodiments, processing array 530 can read input features from first buffer 510 and use them in a computation. Sparse engine 590 sends information back to host system 222 in FIG. 1A for compiling instructions for performing computation such as the matrix multiplication of FIG. 2A.

Figure 3:
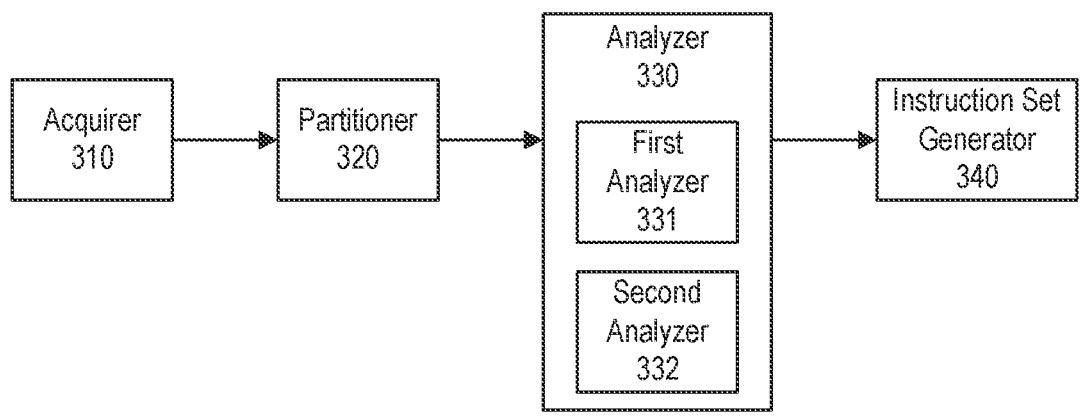
FIG. 3 illustrates a schematic diagram of an exemplary data representing system, consistent with some embodiments of the present disclosure.

FIG. 3 illustrates a schematic diagram of an exemplary data representing system 300, consistent with some embodiments of the present disclosure. Exemplary system 300 can be used in a neural network system to facilitate compiler optimization of the compiler in host memory 221 in FIG. 1A. System 300 employs an exemplary instruction set architecture (ISA) having variable-length vectors that can include multiple vector registers, e.g., RISC-V. As described above with reference to FIG. 1A, one of cores 202 of FIG. 1A can be a RISC-V processor. The embodiments provided herein can also be used with Single Instruction Multiple Data (SIMD). With SIMD, the elements are loaded to fixed-length vectors.

Exemplary system 300 receives an input matrix and a weight matrix of a neural network model, partitions the weight matrix into a row-dominant section and a column-dominant section, identifies memory addresses of non-zero elements in the row-dominant section and in the column-dominant section, generates an instruction set to load the non-zero elements in the row-dominant section into one vector register and load the non-zero elements in the column-dominant section into another vector register. The length of each vector register can be adjusted based on the number of the non-zero elements to be stored. Referring back to FIG. 1B, one or more of first operation unit 2020, second operation unit 2022, and local memory 2032 can include such vector registers for storing input data and output data. Exemplary system 300 can include an acquirer 310, a partitioner 320, an analyzer 330 and an instruction set generator 340. Analyzer 330 can include a first analyzer 331 and a second analyzer 332.

Acquirer 310 receives the input matrix and the weight matrix. The weight matrix is pruned before being received by acquirer 310. In an example of pattern pruning, the elements of the weight matrix are sparsely positioned after pruning and the value of many elements is zero. To avoid use of unnecessary computing power, only non-zero elements are used for multiplication.

As shown in FIG. 2, each element of the weight matrix Y is denoted as a blank square, and each non-zero element is denoted as a shaded square. Elements in the input matrix X can be zeros and non-zeros. Elements not shown are denoted with dots in the input matrix X and the output matrix Z. As described above, some conventional systems load all elements including zero elements to registers for matrix multiplication. For example, the computation to generate output element $Z_{00}=X_{00}*Y_{00}+X_{01}*Y_{10}+X_{02}*Y_{20}++X_{07}*Y_{70}$ requires 8 multiplying operations and 7 adding operations. In contrast, according to some embodiments of the present disclosure, only non-zero elements are used in computing. The computation to generate output element $Z_{00}=X_{01}*Y_{10}+X_{02}*Y_{20}$, which only includes operations involving non-zero elements, only requires two multiplying operations, which minimizes the number of multiplying and adding operations. As a result, computing efficiency is improved.

Computing efficiency can be further improved by processing the non-zero elements having different distribution patterns differently in the weight matrix Y. Elements $Y_{07}$, $Y_{10}$, $Y_{12}$, $Y_{13}$, $Y_{14}$, $Y_{15}$, $Y_{16}$, $Y_{17}$, $Y_{20}$, $Y_{21}$, $Y_{27}$, $Y_{31}$, $Y_{37}$, $Y_{41}$, $Y_{47}$, $Y_{51}$, $Y_{57}$, $Y_{61}$, $Y_{67}$, and $Y_{77}$ in the weight matrix Y are the only remaining non-zero elements after the matrix Y is pruned. These non-zero elements are sparsely positioned in the weight matrix Y and form different distribution patterns in different areas of the matrix. For example, elements $Y_{12}$, $Y_{13}$, $Y_{14}$, $Y_{15}$, and $Y_{16}$ are positioned only on the second row of weight matrix Y and there are no other elements in the weight matrix Y in the corresponding columns of elements $Y_{12}$, $Y_{13}$, $Y_{14}$, $Y_{15}$, and $Y_{16}$. Some conventional systems load elements into registers along columns, for example, element $Y_{12}$ is loaded into one register and is multiplied with element $X_{02}$ to obtain element $Z_{02}$. Similarly, in some conventional systems, element $Y_{13}$ is loaded into another register and is multiplied with element $X_{03}$ to obtain element $Z_{03}$. Similar multiplication is performed with $Y_{14}$, $Y_{15}$, and $Y_{16}$. In such conventional systems, it requires five multiplication operations to process elements $Y_{12}$, $Y_{13}$, $Y_{14}$, $Y_{15}$, and $Y_{16}$. In contrast, the disclosed embodiments reduce the number of multiplying and adding operations by loading into one vector register the five non-zero elements $Y_{12}$, $Y_{13}$, $Y_{14}$, $Y_{15}$, and $Y_{16}$ which are in the same row and multiplying via the vector register elements $Y_{12}$, $Y_{13}$, $Y_{14}$, $Y_{15}$, and $Y_{16}$ with the corresponding elements $X_{12}$, $X_{13}$, $X_{14}$, $X_{15}$, and $X_{16}$. Elements $X_{12}$, $X_{13}$, $X_{14}$, $X_{15}$, and $X_{16}$ can be zero or non-zero. The elements in the matrix X, regardless of being zero or non-zero, are treated the same in the current example. The disclosed embodiments identify the distribution pattern of elements $Y_{12}$, $Y_{13}$, $Y_{14}$, $Y_{15}$, and $Y_{16}$, for example, that they are distributed in the same row. More particularly, in the present example, system 300 classifies at least one portion of matrix Y as a row-dominant section including elements $Y_{12}$, $Y_{13}$, $Y_{14}$, $Y_{15}$, and $Y_{16}$, and system 300 also classifies at least one portion of matrix Y as a column-dominant section including elements $Y_{10}$, $Y_{20}$, $Y_{21}$, $Y_{31}$, $Y_{41}$, $Y_{51}$, and $Y_{61}$ in one section and elements $Y_{07}$, $Y_{17}$, $Y_{27}$, $Y_{37}$, $Y_{47}$, $Y_{57}$, $Y_{67}$ and, $Y_{77}$ in another section.

Figure 4A:
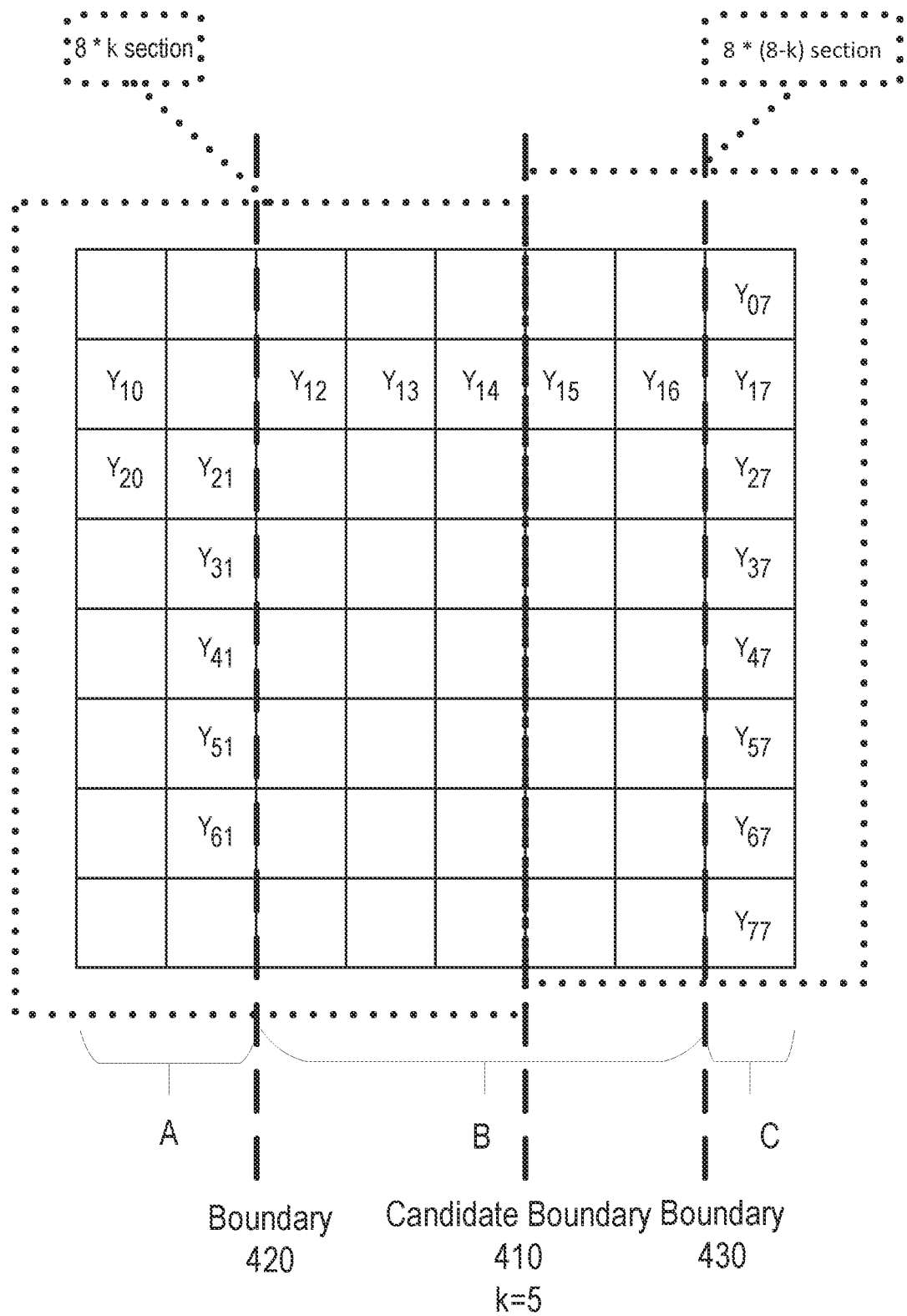
FIG. 4A illustrates a schematic diagram of exemplary matrix partitioning, consistent with some embodiments of the present disclosure.

Partitioner 320 partitions the matrix Y according to the distribution of non-zero elements, as explained with reference to FIG. 4A. Referring to FIGS. 3 and 4A, partitioner 320 traverses the entire matrix Y and determines a larger value between a total number of rows occupied by non-zero elements in the matrix Y and a total number of columns occupied by the same non-zero elements in the matrix Y, classifies at least a first portion of the matrix Y as a first section (e.g., section B shown in FIG. 4A) based on a first distribution pattern of non-zero elements of the portion of the matrix, and classifies at least a second portion of matrix Y as a second section (e.g., section A and section C shown in FIG. 4A) based on a second distribution pattern of non-zero element of the second portion of the matrix that is different from the first distribution pattern. In some embodiments, partitioner 320 determines whether the first distribution pattern comprises a first group of non-zero elements occupying a first number of rows and a first number of columns, and whether the first number of the occupied rows is smaller than the first number of the occupied columns.

As shown in FIG. 4A, in section B, non-zero elements $Y_{12}$, $Y_{13}$, $Y_{14}$, $Y_{15}$, and $Y_{16}$ occupy one row and five columns. System 300 determines that the number of occupied rows is smaller than the number of the occupied columns, and determines that the distribution pattern of section B is row-dominant. Therefore, system 300 classifies section B as a row-dominant section. To find a boundary between section B and an adjacent section (e.g., section A or section C), system 300 uses a dynamic programming partitioning. Dynamic programming is a computer programming method that simplifies a complicated problem by breaking it down into simpler sub-problems in a recursive manner. Finding boundaries between sections that have either a row-dominant pattern or a column-dominant pattern within weight matrix Y is a problem that can be broken down into sub-problems. The dynamic programming partitioning for partitioning weight matrix Y is given by the following formula (1):

$$DP[i][j]=\min(DP[i][k]+DP[k][j], \text{nonzeros\_rows}(DP[i][j]), \text{nonzeros\_columns}(DP[i][j])) \quad (1)$$

where i is a left boundary ranging from 0 to a total column number of the weight matrix (e.g., 8 in matrix Y), j is a right boundary ranging from i to the total column number of the weight matrix, k is a boundary ranging from i to j, nonzeros_rows(DP[i][j]) represents a number of rows occupied by non-zero elements in a portion bounded by boundary i and boundary j, nonzeros_columns(DP[i][j]) represents a number of columns occupied by non-zero elements in the same portion bounded by boundary i and boundary j, k is a boundary that separates a column-dominant section from a row-dominant section, DP[i][k] represents a lower value of a number of rows occupied by non-zero elements in a section bounded by boundary i and boundary k (e.g., the 8 k section in matrix Y) and a number of columns occupied by the same non-zero elements in the section, DP[k][j] represents a smaller value between a number of rows occupied by non-zero elements in a section bounded by boundary k and boundary j (e.g., the 8*(8−k) section in matrix Y) and a number of columns occupied by the same non-zero elements in the same 8*(8−k) section, DP[i][j] represents the minimum value of three numbers, the first number is the sum of DP[i][k] and DP[k][j], the second number is the nonzeros_rows(DP[i][j]), and the third number is the nonzeros_columns(DP[i][j]).

For example, the partitioning is performed on matrix Y according to formula (1) with k being candidate boundaries (e.g., candidate boundary 410 shown in FIG. 4A) by the following formula (2):

$$DP[0][8]=\min\{DP[0][7]+DP[7][8], DP[0][6]+DP[6][8], DP[0][5]+DP[5][8], DP[0][4]+DP[4][8], DP[0][3]+DP[3][8], DP[0][2]+DP[2][8], DP[0][1]+DP[1][8], \text{nonzeros\_rows}(DP[0][8]), \text{nonzeros\_columns}(DP[0][8])\} \quad (2)$$

To calculate DP[0][8], all possible partitioning options for DP[i][j] when k=7, 6, 5, 4, 3, 2, and 1 are calculated. Each of the following summations DP[0][6]+DP[6][8], DP[0][5]+DP[5][8], DP[0][4]+DP[4][8], DP[0][3]+DP[3][8], DP[0][2]+DP[2][8], DP[0][1]+DP[1][8] equals 8, and only DP[0][7]+DP[7][8] equals 7 because DP[0][7] equals 6 and DP[7][8] equals 1. Subsequently, DP[i][j] is assigned as DP[0][7] to find the next potential boundary. The partitioning proceeds in a recursive manner. Calculating DP[0][7] requires calculating all possible partitioning options for DP[0][7] when k=6, 5, 4, 3, 2, and 1. Similarly, summation DP[0][2]+DP[2][7] has a minimum value compared to other values of DP[i][k]+DP[k][j]. Therefore, in weight matrix Y, DP[0][8] equals the minimum value when k=7 and k=2. Accordingly, two boundaries at k=2 and k=7 that partition weight matrix Y into section A, section B, and section C are determined. When the sections are determined, elements in the row-dominant section and the column-dominant section are processed differently for matrix multiplication.

Referring back to FIG. 3, analyzer 330 performs a matrix multiplication operation for section B via first analyzer 331 and for section A and section C via second analyzer 332. Analyzer 331 identifies memory addresses of the non-zero elements in the first section (e.g., section B) of the matrix for loading the non-zero elements along a row in the first section into one or more vector registers. When the first section has more than one row, first analyzer 331 identifies the memory addresses of the non-zero elements in a first row for loading the non-zero elements into a first vector register and identifies the memory addresses of the non-zero elements in a second row for loading the non-zero elements into a second vector register. First analyzer 331 performs a matrix multiplication operation between the weight matrix Y with the input matrix X obtained by acquirer 310. First analyzer 331 first multiplies the non-zero elements in the first row in the first section of the weight matrix Y with corresponding elements in the input matrix X based on the identified memory addresses of the non-zero elements in the first row in the first section of the weight matrix Y. First analyzer 331 further multiplies the non-zero elements in the second row in the first section of the weight matrix Y with corresponding elements in the input matrix X based on the identified memory addresses of the non-zero elements in the second row in the first section of the weight matrix Y.

Figure 4B:
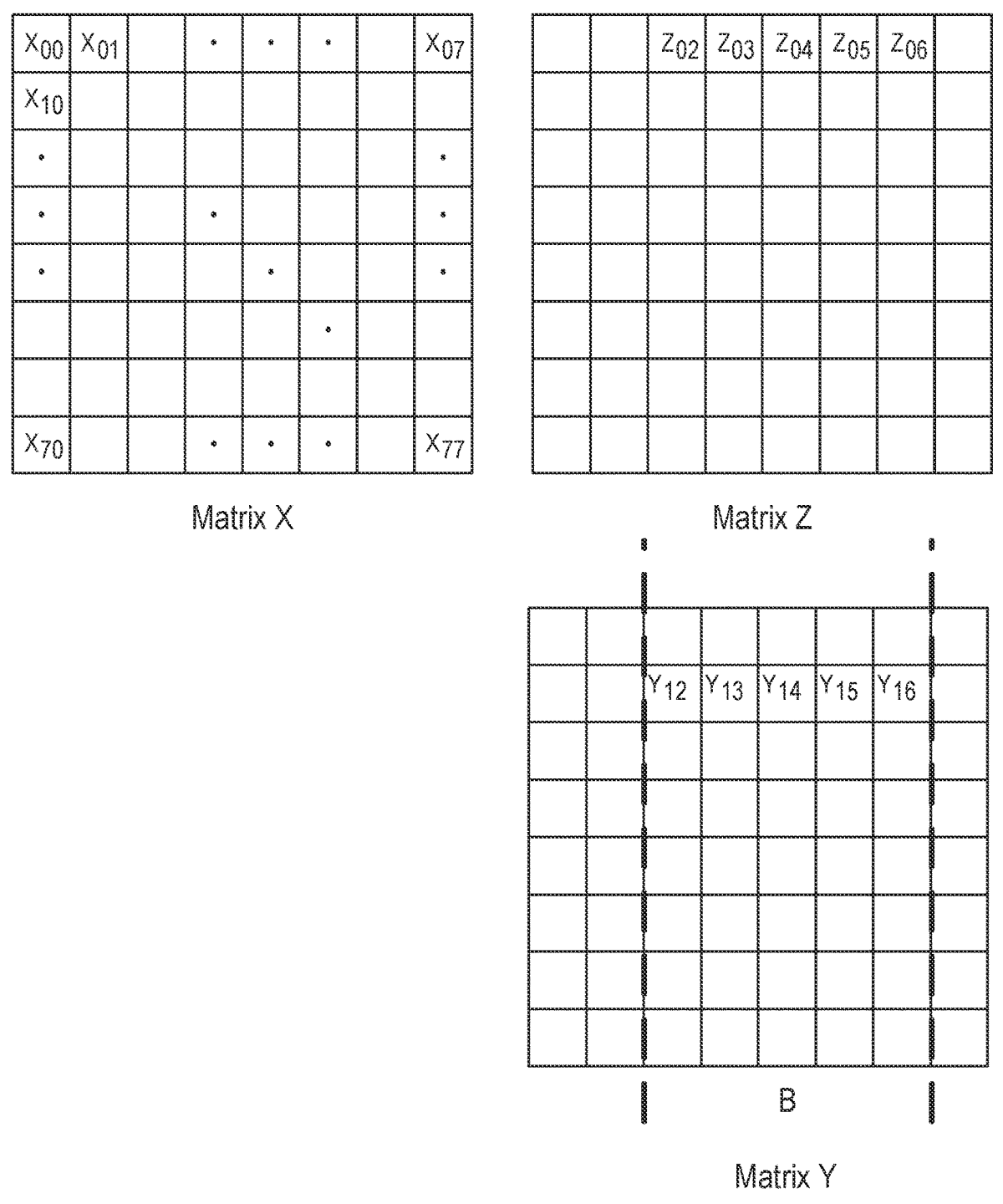

With reference to FIG. 4B, in which the weight matrix Y is shown with only the row of non-zero elements of section B for clarity, section B is determined as a row-dominant section because the total number of rows occupied by non-zero elements (e.g., $Y_{12}$, $Y_{13}$, $Y_{14}$, $Y_{15}$, and $Y_{16}$) in section B is smaller than the total number of columns occupied by non-zero elements in section B. The value of the output element $Z_{02}$ is the dot product of the first row of the input matrix X and the third column of the weight matrix Y: $Z_{02}=X_{00}*Y_{02}+X_{01}*Y_{12}+X_{02}*Y_{22}+\ldots+X_{07}*Y_{72}$. In section B, except for $Y_{12}$, other elements in the third column of the weight matrix Y are zeros. Therefore, the value of the output element $Z_{02}$ can be obtained by multiplying $X_{01}$ and $Y_{12}$: $Z_{02}=X_{01}*Y_{12}$ with zero elements in the weight matrix Y being omitted. Similarly, each column of the remaining columns in section B in the weight matrix Y is used to calculate the output elements $Z_{03}$, $Z_{04}$, $Z_{05}$, and $Z_{06}$, respectively: $Z_{03}=X_{01}*Y_{13}$, $Z_{00}=X_{01}*Y_{14}$, $Z_{05}=X_{01}*Y_{15}$, $Z_{06}=X_{01}*Y_{16}$. Instead of loading $Y_{12}$ into a register and multiplying $X_{01}$ with $Y_{12}$, loading $Y_{13}$ into another register and multiplying $X_{01}$ with $Y_{13}$, and performing the same operations for $Y_{14}$, $Y_{15}$, and $Y_{16}$, first analyzer 331 identifies memory addresses of elements $Y_{12}$, $Y_{13}$, $Y_{14}$, $Y_{15}$, and $Y_{16}$ for loading these five elements into one vector register and multiplies the five elements stored in the vector register with $X_{01}$ to obtain $Z_{02}$, $Z_{03}$, $Z_{04}$, $Z_{05}$, and $Z_{06}$. Because elements stored in a vector register are computed concurrently, multiplication of the five elements only requires one multiplication operation, which is a scalar-vector multiplication. Five multiplication operations for elements $Y_{12}$, $Y_{13}$, $Y_{14}$, $Y_{15}$, and $Y_{16}$ are reduced to one multiplication, since elements $Y_{12}$, $Y_{13}$, $Y_{14}$, $Y_{15}$, and $Y_{16}$ are positioned in the same row in row-dominant section B and can be stored in one vector register for performing one multiplication operation on all elements $Y_{12}$, $Y_{13}$, $Y_{14}$, $Y_{15}$, and $Y_{16}$.

Figure 4C:
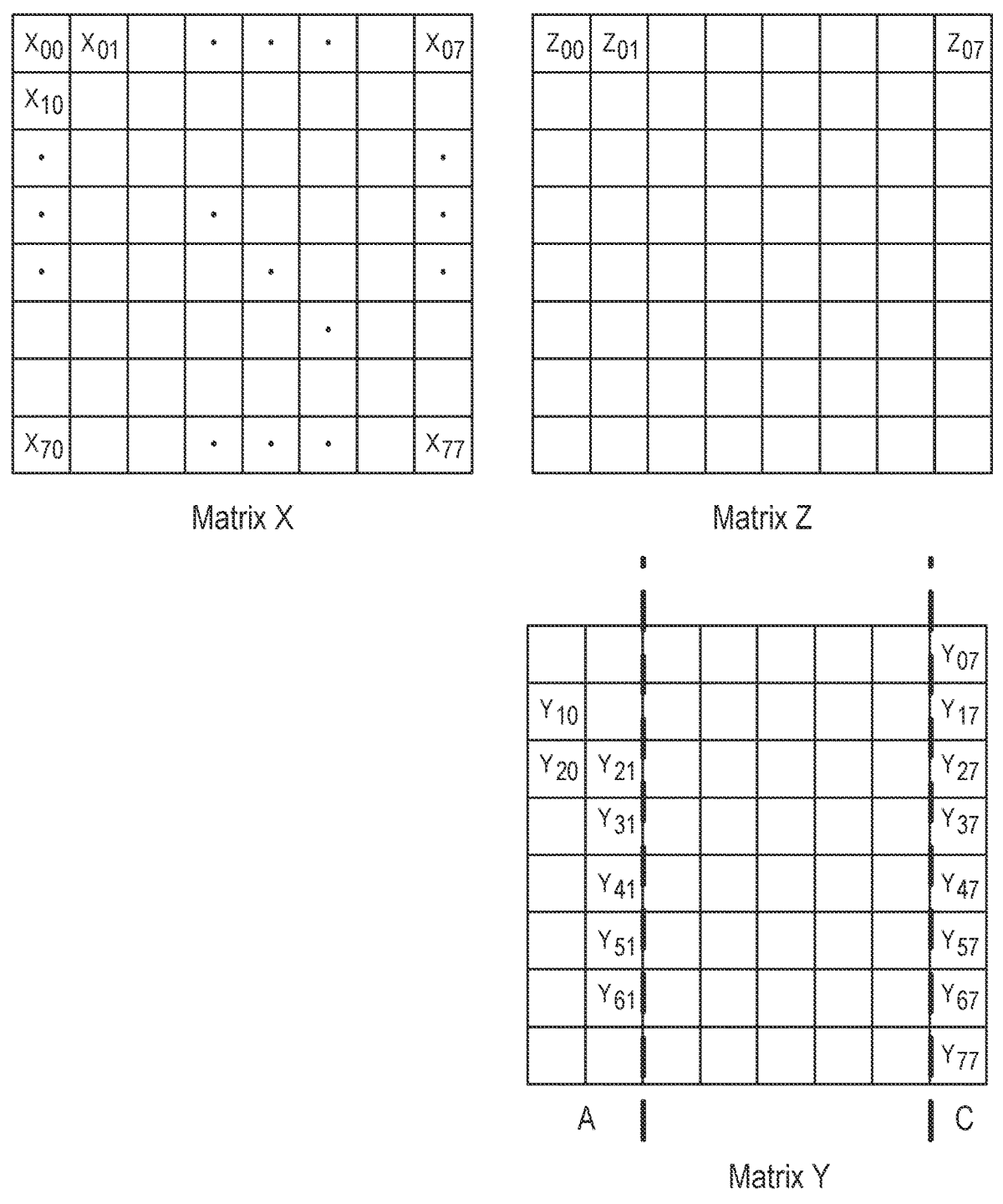

As shown in FIG. 4C, section A and section C are determined as column-dominant sections because the total number of rows occupied by non-zero elements in section A is larger than the total number of columns occupied by non-zero elements in section A. Section C is determined because of the similar reason. Second analyzer 332 shown in FIG. 3 identifies memory addresses of elements $Y_{10}$ and $Y_{20}$, which are in the first column, for loading elements $Y_{10}$ and $Y_{20}$ into a first vector register having a first length equaling 2, and multiplies $Y_{10}$ and $Y_{20}$ stored in the first vector register with elements $X_{01}$ and $X_{02}$ to obtain $Z_{00}$. Second analyzer 332 also identifies memory addresses of elements $Y_{21}$, $Y_{31}$, $Y_{41}$, $Y_{51}$, and $Y_{61}$, which are in the second column, for loading elements $Y_{21}$, $Y_{31}$, $Y_{41}$, $Y_{51}$, and $Y_{61}$ into a second vector register having a second length equaling 5, and multiplies elements $Y_{21}$, $Y_{31}$, $Y_{41}$, $Y_{51}$, and $Y_{61}$ stored in the second vector register with elements $X_{02}$, $X_{03}$, $X_{04}$, $X_{05}$, and $X_{06}$ to obtain $Z_{01}$. Similarly, second analyzer 332 also identifies memory addresses of elements $Y_{07}$, $Y_{17}$, $Y_{27}$, $Y_{37}$, $Y_{47}$, $Y_{57}$, $Y_{67}$, and $Y_{77}$, which are in the eighth column in section C of the weight matrix Y, for loading elements $Y_{07}$, $Y_{17}$, $Y_{27}$, $Y_{37}$, $Y_{47}$, $Y_{57}$, $Y_{67}$, and $Y_{77}$ into a third vector register having a third length equaling 8, and multiplies elements $Y_{07}$, $Y_{17}$, $Y_{27}$, $Y_{37}$, $Y_{47}$, $Y_{57}$, $Y_{67}$, and $Y_{77}$ stored in the third vector register with elements $X_{01}$, $X_{02}$, $X_{03}$, $X_{04}$, $X_{05}$, $X_{06}$, and $X_{07}$ to obtain $Z_{07}$. The length of the vector register is set to be the number of the non-zero elements in each column, respectively, in section A and section C in the weight matrix Y.

Instruction set generator 340 shown in FIG. 3 generates an instruction set based on the memory addresses of the non-zero elements in the first section (e.g., section B) of the matrix to load the non-zero elements in the first section into the one or more vector registers. Matrix multiplication can be represented by:

$$\text{Output}[i][j]=\Sigma_{k=0}{}^n\text{Input}[i][k]*\text{Weight}[k][j]$$

Figure 5:
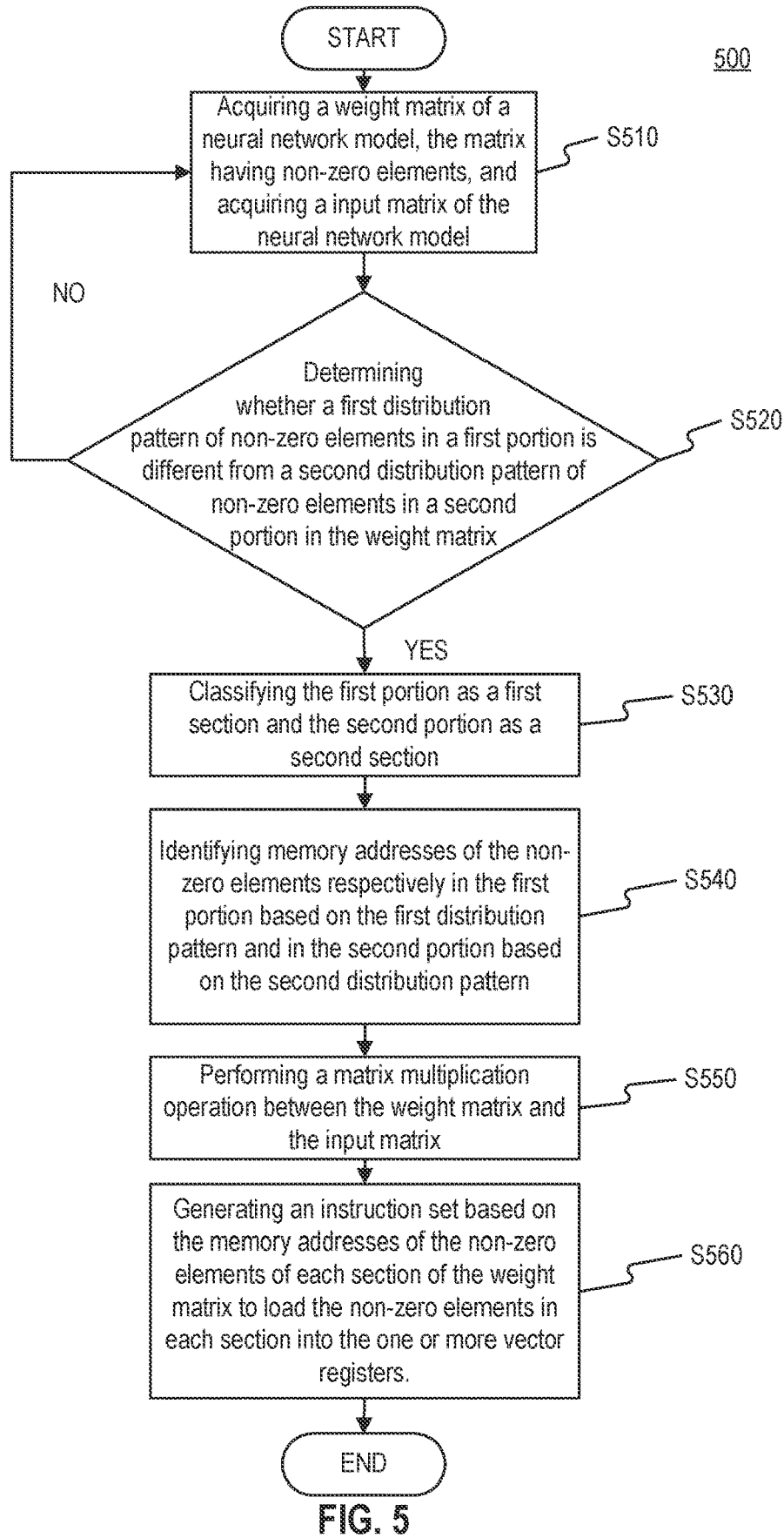
FIG. 5 illustrates a flow chart of an exemplary method for matrix multiplication optimization using vector registers, consistent with some embodiments of the present disclosure.

Exemplary instructions are as follows:
set avl=5; //vector length is set to be 5
ld r1, input_address+1; //ld is a load instruction, r1 is the first row of the input matrix X
vld V1, weight_address+8//vld is a vector loading instruction, the loading starting from element $Y_{12}$
vfmul.vx V2, V1, r1; // multiplication of vector V1 and elements in r1 to obtain output V2;

Instruction set generator 340 also generates an instruction set based on the memory addresses of the non-zero elements in the second section of the matrix to load the non-zero elements into the second section to the one or more vector registers. Exemplary instructions are as follows:
set avl=2;//the length of the vector register is set to 2, which is the number of the non-zero elements in the first column of the weight matrix Y
vld V1, input_address+1;
stride vld V2, weight_address+8, 8;//starting from element $Y_{10}$, stride between two consecutive elements in a column is 8
vfmul.vv V3, V1, V2;
vfredsum.vs V5, V4, V3, V6; //addition operation of matrix multiplication after the multiplication operation;

The embodiments of the present disclosure provide improvements on matrix multiplication by identifying memory addresses of non-zero elements in the weight matrix (e.g., weight matrix Y) for generating an instruction set to load the non-zero elements into variable-length vector registers. FIG. 5 illustrates a flow chart of an exemplary method 500, consistent with some embodiments of the present disclosure. Method 500 can be performed by system 300 and includes the following steps.

In step S510, a matrix of a neural network model is received, e.g., by acquirer 310 shown in FIG. 3. In some embodiments, the matrix is a pruned weight matrix in which a certain number of elements are set to value zero, and the remaining elements are non-zero elements. An input matrix is also received, e.g., by acquirer 310. The weight matrix and the input matrix are acquired for performing matrix multiplication to generate an output matrix. The non-zero elements of the weight matrix are obtained for multiplication.

In step S520, it is determined whether in the weight matrix a first distribution pattern of non-zero elements in a first portion is different from a second distribution pattern of non-zero elements in a second portion, e.g., by partitioner 320. If it is determined that the first distribution pattern of non-zero elements in the first portion is different from the second distribution pattern of non-zero elements in the second portion (step S520—yes), the method proceeds to step S530. In some embodiments, the first distribution pattern has a first group of non-zero elements occupying a first number of rows and a first number of columns, and the first number of the occupied rows is smaller than the first number of the occupied columns. Similarly, the second distribution pattern has a second group of non-zero elements occupying a second number of rows and a second number of columns, the second number of the occupied rows is equal to or greater than the second number of the occupied columns. In the example shown in FIG. 4A, the dynamic programming partitioning is used to partition weight matrix Y using previously described formula (1). Two boundaries that partition weight matrix Y into section A, section B, and section C are determined. When the sections are determined, elements in the row-dominant section and the column-dominant section are processed differently for matrix multiplication.

If it is determined that the first distribution pattern of non-zero elements in the first portion is not different from the second distribution pattern of non-zero elements in the second portion (step S520—no), the method returns to step S510 and another weight matrix and another input matrix are acquired.

In step S530, if it is determined that the first distribution pattern of non-zero elements in the first portion is different from the second distribution pattern of non-zero elements in the second portion, the first portion is classified as a first section based on the first distribution pattern, and the second portion is classified as a second section based on the second distribution pattern, e.g., by partitioner 320.

In step S540, memory addresses of the non-zero elements in the first section of the matrix for loading, according to a first order determined based on the first distribution pattern, the non-zero elements in the first section to one or more vector registers are identified, e.g., by first analyzer 331. In some embodiments, the first distribution pattern is determined as row-dominant, loading the non-zero elements according to the first order can be loading the non-zero elements by row. An exemplary instruction set architecture (e.g., RISC-V) of some embodiments can include multiple vector registers. If the first section has more than one row, memory addresses of non-zero elements in each row are identified. The memory addresses of non-zero elements in the first row are identified for loading the elements into a first vector register, the memory addresses of non-zero elements in the second row are identified for loading the elements into a second vector register. The length of the first vector register is set to be the number of non-zero elements in the first row and the length of the second vector register is set to be the number of non-zero elements in the second row. Memory addresses of the non-zero elements in the second section of the matrix for loading, in a second order determined based on the second distribution pattern, the non-zero elements into the second section to one or more vector registers are identified, e.g., by second analyzer 332. In some embodiments, the second distribution pattern is determined as column-dominant, loading the non-zero elements according to the second order can by loading the non-zero elements by column. Similarly, if the second section has more than one column, memory addresses of non-zero elements in each column are identified for loading the non-zero elements in each row into each vector register. The length of each vector register is set to be the number of non-zero elements in each corresponding column in the second section of the matrix. In the example shown in FIG. 4B, section B is determined as a row-dominant section because the total number of rows occupied by non-zero elements (e.g., $Y_{12}$, $Y_{13}$, $Y_{14}$, $Y_{15}$, and $Y_{16}$) in section B is smaller than the total number of columns occupied by non-zero elements in section B. The value of the output element $Z_{02}$ is the dot product of the first row of the input matrix X and the third column of the weight matrix Y: $Z_{02}=X_{00}*Y_{02}+X_{01}*Y_{12}+X_{02}*Y_{22}++X_{07}*Y_{72}$. In section B, except for $Y_{12}$, other elements in the third column of the weight matrix Y are zeros. Therefore, the value of the output element $Z_{02}$ can be obtained by multiplying $X_{01}$ and $Y_{12}$: $Z_{02}=X_{01}*Y_{12}$ with zero elements in the weight matrix Y beings omitted. Similarly, each column of the remaining columns in section B in the weight matrix Y is used to calculate the output elements $Z_{03}$, $Z_{04}$, $Z_{05}$, and $Z_{06}$, respectively: $Z_{03}=X_{01}*Y_{13}$, $Z_{00}=X_{01}*Y_{14}$, $Z_{05}=X_{01}*Y_{15}$, $Z_{06}=X_{01}*Y_{16}$. Instead of loading $Y_{12}$ into a register and multiplying $X_{01}$ with $Y_{12}$, loading $Y_{13}$ into another register and multiplying $X_{01}$ with $Y_{13}$, and performing the same operations for $Y_{14}$, $Y_{15}$, and $Y_{16}$, first analyzer 331 identifies memory addresses of elements $Y_{12}$, $Y_{13}$, $Y_{14}$, $Y_{15}$, and $Y_{16}$ for loading these five elements into one vector register and multiplies the five elements stored in the vector register with $X_{01}$ to obtain $Z_{02}$, $Z_{03}$, $Z_{04}$, $Z_{05}$, and $Z_{06}$.

In step S550, a matrix multiplication operation between the weight matrix and the input matrix is performed by multiplying the non-zero elements in the first section of the weight matrix with corresponding elements in the input matrix based on the identified memory addresses of the non-zero elements in the first section, e.g., by first analyzer 331, and multiplying the non-zero elements in the second section of the weight matrix with corresponding elements in the input matrix based on the identified memory addresses of the non-zero elements in the second section, e.g., by second analyzer 332. In the example shown in FIG. 4B, because elements stored in a vector register are computed concurrently, multiplication of the five elements only requires one multiplication operation, which is a scalar-vector multiplication. Five multiplication operations for elements $Y_{12}$, $Y_{13}$, $Y_{14}$, $Y_{15}$, and $Y_{16}$ are reduced to one multiplication, since elements $Y_{12}$, $Y_{13}$, $Y_{14}$, $Y_{15}$, and $Y_{16}$ are positioned in the same row in row-dominant section B and can be stored in one vector register for performing one multiplication operation on all elements $Y_{12}$, $Y_{13}$, $Y_{14}$, $Y_{15}$, and $Y_{16}$.

In step S560, an instruction set is generated, e.g., by instruction set generator 340, based on the memory addresses of the non-zero elements of each section of the weight matrix to load the non-zero elements in each section into the one or more vector registers. If the first section has more than one row, the non-zero elements in each row are loaded into each vector register for being multiplied with the corresponding elements in the input matrix. Similarly, if the second section has more than one column, the non-zero elements into each column are loaded into each vector register for being multiplied with the corresponding elements in the input matrix. The length of the vector register is set to be the number of the non-zero elements in each row respectively in the first section or each column in the second section in the weight matrix.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. It is understood that multiple ones of the above described modules/units may be combined as one module/unit, and each of the above described modules/units may be further divided into a plurality of sub-modules/sub-units.

Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

The embodiments may further be described using the following clauses:

1. A method comprising:
   receiving a matrix of a neural network model;
   classifying at least a portion of the matrix as a first section based on a first distribution pattern of non-zero elements of the portion of the matrix; and
   identifying memory addresses of the non-zero elements in the first section of the matrix for loading, according to a first order determined based on the first distribution pattern, the non-zero elements in the first section into one or more vector registers.
2. The method of clause 1, wherein identifying the memory addresses of the non-zero elements in the first section of the matrix for loading, according to a first order determined based on the first distribution pattern, the non-zero elements in the first section into the one or more vector registers comprises:
   identifying the memory addresses of the non-zero elements in a first row of the first section of the matrix for loading the non-zero elements in the first row into a first vector register of the one or more vector registers.
3. The method of clause 1 or 2, wherein identifying the memory addresses of the non-zero elements in the first section of the matrix for loading, according to a first order determined based on the first distribution pattern, the non-zero elements in the first section into the one or more vector registers comprises:
   identifying the memory addresses of the non-zero elements in a second row of the first section of the matrix for loading the non-zero elements in the second row into a second vector register of the one or more vector registers.
4. The method of any one of clauses 1-3, wherein the matrix is a weight matrix of the neural network model, the method further comprising:
   receiving an input matrix of the neural network model;
   performing a matrix multiplication operation between the weight matrix and the input matrix by multiplying the non-zero elements in the first row in the first section of the weight matrix with corresponding elements in the input matrix based on the identified memory addresses of the non-zero elements in the first row in the first section, and multiplying the non-zero elements in the second row in the first section of the weight matrix with corresponding elements in the input matrix based on the identified memory addresses of the non-zero elements in the second row in the first section.
5. The method of any one of clauses 1-4, wherein the portion of the matrix is a first portion, the method further comprising:
   classifying at least a second portion of the matrix as a second section based on a second distribution pattern of non-zero element of the second portion of the matrix that is different from the first distribution pattern.
6. The method of any one of clauses 1-5, further comprising:
   identifying memory addresses of the non-zero elements of the second section of the matrix for loading, according to a second order determined based on the second distribution pattern, the non-zero elements in the second section into one or more vector registers.
7. The method of any one of clauses 1-5, wherein classifying at least the second portion of the matrix as the second section comprises:
   determining whether the second distribution pattern comprises a second group of non-zero elements occupying a second number of rows and a second number of columns, the second number of the occupied rows being equal to or greater than the second number of the occupied columns.
8. The method of any one of clauses 1-7, wherein classifying at least the first portion of the matrix as the first section comprises:
   determining whether the first distribution pattern comprises a first group of non-zero elements occupying a first number of rows and a first number of columns, the first number of the occupied rows being smaller than the first number of the occupied columns.
9. The method of any one of clauses 1-8, wherein the matrix is a pruned matrix.
10. The method of any one of clause 1-9, further comprising
    generating an instruction set based on the memory addresses of the non-zero elements in the first section of the matrix to load the non-zero elements in the first section into the one or more vector registers.
11. The method of any one of clauses 1-10, wherein generating an instruction set based on the memory addresses of the non-zero elements in the first section of the matrix to load the non-zero elements in the first section into the one or more vector registers comprises:
    generating one or more instructions of the instruction set based on the memory addresses of the non-zero elements in the first row of the first section of the matrix to load the non-zero elements in the first row of the first section into the first vector register.

12. An apparatus comprising:
   a memory storing a set of instructions; and
   one or more processors configured to execute the set of instruction to cause the apparatus to perform:
   receiving a matrix of a neural network model,
   classifying at least a portion of the matrix as a first section based on a first distribution pattern of non-zero elements of the portion of the matrix, and
   identifying memory addresses of the non-zero elements in the first section of the matrix for loading, according to a first order determined based on the first distribution pattern, the non-zero elements in the first section into one or more vector registers.
13. The apparatus of clause 12, wherein identifying the memory addresses of the non-zero elements in the first section of the matrix for loading, according to a first order determined based on the first distribution pattern, the non-zero elements in the first section into the one or more vector registers comprises:
   identifying the memory addresses of the non-zero elements in a first row of the first section of the matrix for loading the non-zero elements in the first row into a first vector register of the one or more vector registers.
14. The apparatus of clause 12 or 13, wherein identifying the memory addresses of the non-zero elements in the first section of the matrix for loading, according to a first order determined based on the first distribution pattern, the non-zero elements in the first section into the one or more vector registers comprises:
   identifying the memory addresses of the non-zero elements in a second row of the first section of the matrix for loading the non-zero elements in the second row into a second vector register of the one or more vector registers.
15. The apparatus of any one of clauses 12-14, wherein the matrix is a weight matrix of the neural network model, the one or more processors configured to execute the set of instructions to cause the apparatus to further perform:
   receiving an input matrix of the neural network model;
   performing a matrix multiplication operation between the weight matrix and the input matrix by multiplying the non-zero elements in the first row in the first section of the weight matrix with corresponding elements in the input matrix based on the identified memory addresses of the non-zero elements in the first row in the first section, and multiplying the non-zero elements in the second row in the first section of the weight matrix with corresponding elements in the input matrix based on the identified memory addresses of the non-zero elements in the second row in the first section.
16. The apparatus of any one of clauses 12-15, wherein the portion of the matrix is a first portion, the one or more processors configured to execute the set of instructions to cause the apparatus to further perform:
   classifying at least a second portion of the matrix as a second section based on a second distribution pattern of non-zero element of the second portion of the matrix that is different from the first distribution pattern.
17. The apparatus of any one of clauses 12-16, the one or more processors configured to execute the set of instructions to cause the apparatus to further perform:
   identifying memory addresses of the non-zero elements of the second section of the matrix for loading, according to a second order determined based on the second distribution pattern, the non-zero elements in the second section into one or more vector registers.
18. The apparatus of any one of clauses 12-16, wherein classifying at least the second portion of the matrix as the second section comprises:
   determining whether the second distribution pattern comprises a second group of non-zero elements occupying a second number of rows and a second number of columns, the second number of the occupied rows being equal to or greater than the second number of the occupied columns.
19. The apparatus of any one of clauses 12-18, wherein classifying at least the first portion of the matrix as the first section comprises:
   determining whether the first distribution pattern comprises a first group of non-zero elements occupying a first number of rows and a first number of columns, the first number of the occupied rows being smaller than the first number of the occupied columns.
20. The apparatus of any one of clause 12-19, wherein the matrix is a pruned matrix.
21. The apparatus of any one of clauses 12-20, the one or more processors configured to execute the set of instructions to cause the apparatus to further perform:
   generating an instruction set based on the memory addresses of the non-zero elements in the first section of the matrix to load the non-zero elements in the first section into the one or more vector registers.
22. The apparatus of any one of clauses 12-21, wherein generating an instruction set based on the memory addresses of the non-zero elements in the first section of the matrix to load the non-zero elements in the first section into the one or more vector registers comprises:
   generating one or more instructions of the instruction set based on the memory addresses of the non-zero elements in the first row of the first section of the matrix to load the non-zero elements in the first row of the first section into the first vector register.
23. A non-transitory computer readable medium that stores a set of instructions that is executable by at least one processor of a computer to cause the computer to perform a method, the method comprising:
   receiving a matrix of a neural network model;
   classifying at least a portion of the matrix as a first section based on a first distribution pattern of non-zero elements of the portion of the matrix; and
   identifying memory addresses of the non-zero elements in the first section of the matrix for loading, according to a first order determined based on the first distribution pattern, the non-zero elements in the first section into one or more vector registers.
24. The non-transitory computer readable medium of clause 23, wherein identifying the memory addresses of the non-zero elements in the first section of the matrix for loading, according to a first order determined based on the first distribution pattern, the non-zero elements in the first section into the one or more vector registers comprises:
   identifying the memory addresses of the non-zero elements in a first row of the first section of the matrix for loading the non-zero elements in the first row into a first vector register of the one or more vector registers.
25. The non-transitory computer readable medium of clause 23 or 24, wherein identifying the memory addresses of the non-zero elements in the first section of the matrix for loading, according to a first order determined based on the first distribution pattern, the non-zero elements in the first section into the one or more vector registers comprises:

identifying the memory addresses of the non-zero elements in a second row of the first section of the matrix for loading the non-zero elements in the second row into a second vector register of the one or more vector registers.

26. The non-transitory computer readable medium of any one of clause 23-25, wherein the matrix is a weight matrix of the neural network model, the set of instructions that are executable by the at least one processor of a computer to cause the computer to further perform:

receiving an input matrix of the neural network model;

performing a matrix multiplication operation between the weight matrix and the input matrix by multiplying the non-zero elements in the first row in the first section of the weight matrix with corresponding elements in the input matrix based on the identified memory addresses of the non-zero elements in the first row in the first section, and multiplying the non-zero elements in the second row in the first section of the weight matrix with corresponding elements in the input matrix based on the identified memory addresses of the non-zero elements in the second row in the first section.

27. The non-transitory computer readable medium of any one of clause 23-27, wherein the portion of the matrix is a first portion, the set of instructions that are executable by the at least one processor of a computer to cause the computer to further perform:

classifying at least a second portion of the matrix as a second section based on a second distribution pattern of non-zero element of the second portion of the matrix that is different from the first distribution pattern.

28. The non-transitory computer readable medium of any one of clauses 23-27, wherein the set of instructions that are executable by the at least one processor of a computer to cause the computer to further perform:

identifying memory addresses of the non-zero elements of the second section of the matrix for loading, according to a second order determined based on the second distribution pattern, the non-zero elements in the second section into one or more vector registers.

29. The non-transitory computer readable medium of any one of clauses 23-27, wherein classifying at least the second portion of the matrix as the second section comprises:

determining whether the second distribution pattern comprises a second group of non-zero elements occupying a second number of rows and a second number of columns, the second number of the occupied rows being equal to or greater than the second number of the occupied columns.

30. The non-transitory computer readable medium of any one of clauses 23-29, wherein classifying at least the first portion of the matrix as the first section comprises:

determining whether the first distribution pattern comprises a first group of non-zero elements occupying a first number of rows and a first number of columns, the first number of the occupied rows being smaller than the first number of the occupied columns.

31. The non-transitory computer readable medium of any one of clause 23-30, wherein the matrix is a pruned matrix.

32. The non-transitory computer readable medium of any one of clause 23-31, wherein the set of instructions that are executable by the at least one processor of a computer to cause the computer to further perform:

generating an instruction set based on the memory addresses of the non-zero elements in the first section of the matrix to load the non-zero elements in the first section into the one or more vector registers.

33. The non-transitory computer readable medium of any one of clauses 23-32, wherein generating an instruction set based on the memory addresses of the non-zero elements in the first section of the matrix to load the non-zero elements in the first section into the one or more vector registers comprises:

generating one or more instructions of the instruction set based on the memory addresses of the non-zero elements in the first row of the first section of the matrix to load the non-zero elements in the first row of the first section into the first vector register.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method. In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A method comprising:

receiving a matrix of a neural network model;

classifying at least a first portion of the matrix as a first section based on a first distribution pattern of non-zero elements of the first portion of the matrix;

classifying at least a second portion of the matrix as a second section based on a second distribution pattern of non-zero elements in the second portion of the matrix that is different from the first distribution pattern;

identifying memory addresses of the non-zero elements in the first section of the matrix for loading, according to a first order determined based on the first distribution pattern, the non-zero elements in the first section into one or more vector registers; and identifying memory addresses of the non-zero elements in the second section of the matrix for loading, according to a second order determined based on the second distribution pattern, the non-zero elements in the second section into one or more vector registers.

2. The method of claim 1, wherein identifying the memory addresses of the non-zero elements in the first section of the matrix for loading, according to a first order determined based on the first distribution pattern, the non-zero elements in the first section into the one or more vector registers comprises:

identifying the memory addresses of the non-zero elements in a first row of the first section of the matrix for loading the non-zero elements in the first row into a first vector register of the one or more vector registers.

3. The method of claim 2, wherein identifying the memory addresses of the non-zero elements in the first section of the matrix for loading, according to a first order determined based on the first distribution pattern, the non-zero elements in the first section into one or more vector registers comprises:

identifying the memory addresses of the non-zero elements in a second row of the first section of the matrix for loading the non-zero elements in the second row into a second vector register of the one or more vector registers.

4. The method of claim 3, wherein the matrix is a weight matrix of the neural network model, the method further comprising:

receiving an input matrix of the neural network model;

performing a matrix multiplication operation between the weight matrix and the input matrix by multiplying the non-zero elements in the first row in the first section of the weight matrix with corresponding elements in the input matrix based on the identified memory addresses of the non-zero elements in the first row in the first section, and multiplying the non-zero elements in the second row in the first section of the weight matrix with corresponding elements in the input matrix based on the identified memory addresses of the non-zero elements in the second row in the first section.

5. The method of claim 1, wherein the first distribution pattern is associated with a number of rows or a number of columns occupied by the non-zero elements.

6. The method of claim 1, wherein classifying at least the second portion of the matrix as the second section comprises:

determining whether the second distribution pattern comprises a second group of non-zero elements occupying a second number of rows and a second number of columns, the second number of the occupied rows being equal to or greater than the second number of the occupied columns.

7. The method of claim 1, wherein classifying at least the first portion of the matrix as the first section comprises:

determining whether the first distribution pattern comprises a first group of non-zero elements occupying a first number of rows and a first number of columns, the first number of the occupied rows being smaller than the first number of the occupied columns.

8. The method of claim 1, wherein
the matrix is a pruned matrix.

9. The method of claim 1, further comprising
generating an instruction set based on the memory addresses of the non-zero elements in the first section of the matrix to load the non-zero elements in the first section into the one or more vector registers.

10. The method of claim 9, wherein generating an instruction set based on the memory addresses of the non-zero elements in the first section of the matrix to load the non-zero elements in the first section into the one or more vector registers comprises:

generating one or more instructions of the instruction set based on the memory addresses of the non-zero elements in a first row of the first section of the matrix to load the non-zero elements in the first row of the first section into a first vector register.

11. An apparatus comprising:
a memory storing a set of instructions; and
one or more processors configured to execute the set of instruction to cause the apparatus to perform:

receiving a matrix of a neural network model;
classifying at least a first portion of the matrix as a first section based on a first distribution pattern of non-zero elements in the first portion of the matrix;
classifying at least a second portion of the matrix as a second section based on a second distribution pattern of non-zero elements in the second portion of the matrix that is different from the first distribution pattern;
identifying memory addresses of the non-zero elements in the first section of the matrix for loading, according to a first order determined based on the first distribution pattern, the non-zero elements in the first section into one or more vector registers; and
identifying memory addresses of the non-zero elements in the second section of the matrix for loading, according to a second order determined based on the second distribution pattern, the non-zero elements in the second section into one or more vector registers.

12. A non-transitory computer readable medium that stores a set of instructions that is executable by at least one processor of a computer to cause the computer to perform a method, the method comprising:

receiving a matrix of a neural network model;
classifying at least a first portion of the matrix as a first section based on a first distribution pattern of non-zero elements in the first portion of the matrix;
classifying at least a second portion of the matrix as a second section based on a second distribution pattern of non-zero elements in the second portion of the matrix that is different from the first distribution pattern;
identifying memory addresses of the non-zero elements in the first section of the matrix for loading, according to a first order determined based on the first distribution pattern, the non-zero elements in the first section into one or more vector registers; and
identifying memory addresses of the non-zero elements in the second section of the matrix for loading, according to a second order determined based on the second distribution pattern, the non-zero elements in the second section into one or more vector registers.

13. The non-transitory computer readable medium of claim 12, wherein identifying the memory addresses of the non-zero elements in the first section of the matrix for loading, according to a first order determined based on the first distribution pattern, the non-zero elements in the first section into the one or more vector registers comprises:

identifying the memory addresses of the non-zero elements in a first row of the first section of the matrix for loading the non-zero elements in the first row into a first vector register of the one or more vector registers.

14. The non-transitory computer readable medium of claim 13, wherein identifying the memory addresses of the non-zero elements in the first section of the matrix for loading, according to a first order determined based on the first distribution pattern, the non-zero elements in the first section into the one or more vector registers comprises:

identifying the memory addresses of the non-zero elements in a second row of the first section of the matrix for loading the non-zero elements in the second row into a second vector register of the one or more vector registers.

15. The non-transitory computer readable medium of claim 14, wherein the matrix is a weight matrix of the neural network model, the set of instructions that are executable by the at least one processor of a computer to cause the computer to further perform:

receiving an input matrix of the neural network model;

performing a matrix multiplication operation between the weight matrix and the input matrix by multiplying the non-zero elements in the first row in the first section of the weight matrix with corresponding elements in the input matrix based on the identified memory addresses of the non-zero elements in the first row in the first section, and multiplying the non-zero elements in the second row in the first section of the weight matrix with corresponding elements in the input matrix based on the identified memory addresses of the non-zero elements in the second row in the first section.

16. The non-transitory computer readable medium of claim 12, wherein the first distribution pattern is associated with a number of rows or a number of columns occupied by the non-zero elements.

17. The non-transitory computer readable medium of claim 12, wherein classifying at least the second portion of the matrix as the second section comprises:
determining whether the second distribution pattern comprises a second group of non-zero elements occupying a second number of rows and a second number of columns, the second number of the occupied rows being equal to or greater than the second number of the occupied columns.

18. The non-transitory computer readable medium of claim 12, wherein classifying at least the first portion of the matrix as the first section comprises:
determining whether the first distribution pattern comprises a first group of non-zero elements occupying a first number of rows and a first number of columns, the first number of the occupied rows being smaller than the first number of the occupied columns.

* * * * *